Dec. 26, 1961
S. A. TROELSTRA ET AL
3,015,047
ELECTROLYTIC CAPACITOR
Filed April 2, 1958
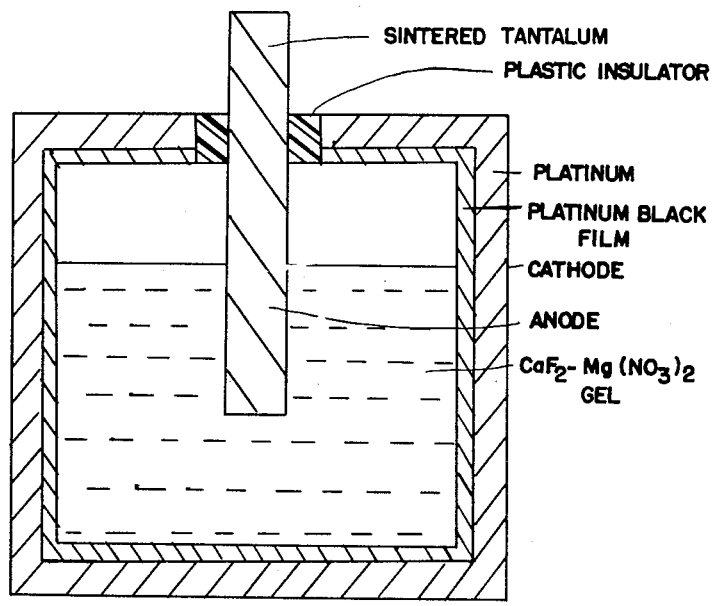
INVENTORS
SJERP ANNE TROELSTRA
PETER WINKEL
BY
AGENT

United States Patent Office 3,015,047
Patented Dec. 26, 1961

3,015,047
ELECTROLYTIC CAPACITOR
Sjerp Anne Troelstra and Peter Winkel, Eindhoven, Netherlands, assignors to North American Philips Company, Inc., New York, N.Y., a corporation of Delaware
Filed Apr. 2, 1958, Ser. No. 725,851
Claims priority, application Netherlands Apr. 3, 1957
3 Claims. (Cl. 317—230)

This invention relates to electrolytic capacitors.

The use of electrolytes in the form of a paste or a gel in electrolytic capacitors is known. For this purpose, many different substances, for example organic binders, such as starch, have been added to the usual electrolytes and also inorganic substances such as bentonite and silica, suspensions of which can be obtained with sufficient rigidity. The use of such so-called solid electrolytes are important more particularly if difficulties are encountered in sealing the capacitor.

As a rule, the resistivity of such solid electrolytes is greatly increased in proportion to the content of the substance added. However, it has been found that gels can be obtained from alkaline earth fluorides of a kind which, as a result of a high content of electrolyte, have a low resistivity and are durable in air without troublesome desiccation.

As described in the co-pending British patent application No. 37,823/56, the relevant gels of alkaline earth fluorides may be obtained from a dispersion thereof in a polar liquid by adding to the dispersion a solution containing potential-determining ions, resulting in the surface charge of the dispersed fluoride particles being increased, and coagulating the dispersion in this condition to form a gel, preferably with the aid of the same electrolyte as the coagulation agent, which has also brought about the charge of the particles.

The term "potential-determining ions" is to be understood to mean either positive or negative ions of the dispersed substance, or ions which can replace the first-mentioned ions at the surface of the particles or in the lattice of the constitutive material of the particles.

Charging and if desired coagulation may be effected by means of solutions of electrolytes, such as solutions of halides, nitrates and sulphates, for example KCl, KI, $CaCl_2$, $Mg(NO_3)_2$ and $ZnSO_4$, which in themselves can also be used as an electrolyte in electrolytic capacitors having an electrode of tantalum or columbium covered with a dielectric oxide layer. It is also possible to coagulate, after charging, by means of an electrolyte which has not been used for the charge or by adding a less polar dispersion liquid, for example by adding alcohol or acetone, to gels with water as the dispersion medium.

The present invention relates to an electrolytic capacitor comprising at least one electrode of tantalum or columbium, covered with a dielectric oxide layer, and an electrolyte consisting of a dispersion of alkaline earth fluoride particles in a polar liquid, coagulated to form a gel, which dispersion contains ions increasing the surface charge of the particles, it also being possible for further electrolytes usually employed in such an electrolytic capacitor to be added to the gel in so far they do not disturb the gel state.

The single figure of the drawing shows one embodiment of the invention.

In the examples following hereinafter, it is described in what manner a number of the electrolytes concerned can be obtained. Furthermore, for comparison purposes, the resistivity of the relevant gel and of a liquid electrolyte of the same composition, but without dispersed fluoride particles are specified.

For manufacturing gel-electrolytes according to the invention, the initial material used, is, for example, freshly precipitated $CaF_2$. This is obtained by adding in small amounts whilst stirring 48%-hydrofluoric acid to 200 g. of ground chalk suspended in 200 cc. of water till acid reaction just remains (pH about 4) and subsequently sucking off the precipitate. Gel-electrolytes are manufactured therewith as follows:

(1) 15 g. of $CaF_2$ are mixed while intensely rubbing with 4 cc. of a solution containing 6 mols. of KI per litre water. The resistivity of the KI-solution is $3\Omega$ cm. and that of the gel $8\Omega$ cm.

(2) 15 g. of $CaF_2$ are stirred together with 6 cc. of a solution containing 6 mols. of $CaCl_2$ per litre water to form a gel. The resistivity of the $CaCl_2$-solution is $8\Omega$ cm. and that of the gel is $17\Omega$ cm.

(3) 15 g. of $CaF_2$ are stirred together with 3.6 cc. of a $Mg(NO_3)_2$-solution which is substantially saturated at room temperature. The resistivity of the $Mg(NO_3)_2$-solution is $12\Omega$ cm. and that of the resultant $CaF_2$-suspension is $34\Omega$ cm.

An electrolytic capacitor is composed, for example, of an anode comprising a porous sintered tantalum pastille having a diameter of 1.5 mms. and a length of 5 mms., which is arranged in centred position in a cylindrical cathode having an inner diameter of 10 mms. which consists of platinum and the inner side of which is covered with a thin layer of platinum black of about 1 micron thick. The anode has been electrolytically oxidized to a voltage of 8 volts in a 24 N phosphoric-acid electrolyte. The table following hereinafter specifies the series-resistance and the capacity, measured at a frequency of 50 c./s., of this capacitor with an electrolyte as above described, that is to say KI—, CaCl—$_2$ and $Mg(NO_3)_2$-solutions or the $CaF_2$ gels manufactured therewith.

| No. | Electrolyte | R in $\Omega$ | C in $\mu f$. |
|---|---|---|---|
| 1 | KI-solution | 2.7 | 23.7 |
|   | $CaF_2$-gel with KI | 5.0 | 23.6 |
| 2 | $CaCl_2$-solution | 5.4 | 23 |
|   | $CaF_2$-gel with $CaCl_2$ | 10 | 23 |
| 3 | $Mg(NO_3)_2$-solution | 7.3 | 23 |
|   | $CaF_2$-gel with $Mg(NO_3)_2$ | 20 | 23 |

What is claimed is:

1. In an electrolytic capacitor containing at least one electrode selected from the class consisting of tantalum and columbium, a gel electrolyte consisting of a coagulated dispersion containing dispersed alkaline earth fluoride particles and potential determining ions in a polar liquid.

2. In an electrolytic capacitor containing at least one electrode consisting of tantalum, a gel electrolyte consisting of a coagulated dispersion containing dispersed alkaline earth fluoride particles and potential determining ions in a polar liquid.

3. In an electrolytic capacitor containing at least one electrode consisting of columbium, a gel electrolyte consisting of a coagulated dispersion containing dispersed alkaline earth fluoride particles and potential determining ions in a polar liquid.

References Cited in the file of this patent

UNITED STATES PATENTS

| | | |
|---|---|---|
| 1,602,951 | Slepian | Oct. 12, 1926 |
| 1,645,085 | Bensing | Oct. 11, 1927 |
| 1,714,319 | Ruben | May 21, 1929 |
| 1,773,665 | Edelman | Aug. 19, 1930 |
| 1,891,206 | Ruben | Dec. 13, 1932 |
| 2,710,369 | Booe | June 7, 1955 |
| 2,862,157 | Haring | Nov. 25, 1958 |